United States Patent [19]

McKelvey

[11] Patent Number: 4,642,937
[45] Date of Patent: Feb. 17, 1987

[54] NONABSORBENT ROLLER APPLICATOR

[75] Inventor: Robert A. McKelvey, Bloomington, Ill.

[73] Assignee: The United States of America as represented by the Secretary of Agriculture, Washington, D.C.

[21] Appl. No.: 651,563

[22] Filed: Sep. 18, 1984

[51] Int. Cl.⁴ .......................................... A01G 13/00
[52] U.S. Cl. .................................................. 47/1.5
[58] Field of Search .................... 47/1.5, 1.7; 101/169

[56] References Cited

U.S. PATENT DOCUMENTS

| 2,696,696 | 12/1954 | Tigerman | 47/1.5 |
| 2,891,471 | 6/1959 | Sengewald | 101/169 |
| 2,935,818 | 5/1960 | Crane | 47/1.5 |
| 3,158,892 | 12/1964 | Bridger et al. | 47/1.5 |
| 3,309,992 | 3/1967 | Motter | 101/169 |
| 4,168,798 | 9/1979 | Moore et al. | 47/1.7 |
| 4,208,835 | 6/1980 | Roll et al. | 47/1.5 |
| 4,223,479 | 9/1980 | Burnside | 47/1.5 |
| 4,253,272 | 3/1981 | Bertness | 47/1.5 |
| 4,265,048 | 5/1981 | Schepers et al. | 47/1.5 |
| 4,346,531 | 8/1982 | Keeton | 47/1.5 |
| 4,347,684 | 9/1982 | Keeton | 47/1.5 |
| 4,471,568 | 9/1984 | Keeton | 47/1.5 |

FOREIGN PATENT DOCUMENTS

| 2428395 | 2/1980 | France | 47/1.5 |
| 2083732A | 3/1982 | United Kingdom | |

Primary Examiner—Robert A. Hafer
Assistant Examiner—Bradley M. Lewis
Attorney, Agent, or Firm—M. Howard Silverstein; David G. McConnell; Curtis P. Ribando

[57] ABSTRACT

A roller applicator for treating plants with herbicides and other fluids comprises a nonabsorbent textured roller, a low-pressure fluid delivery system, and means for collecting and recirculating the fluid. The components of the apparatus act in cooperation with one another so as to minimize loss of material by drippage, spray drift, and holdup in the components of the device. The applicator can be used with solutions as well as wettable powders, emulsifiable concentrates, and other multiphase formulations without separation.

2 Claims, 4 Drawing Figures

NONABSORBENT ROLLER APPLICATOR

BACKGROUND OF THE INVENTION

1. Field of the Invention

In recent years considerable attention has been given to the roller applicator for applying solutions of herbicides for the control of weeds growing amongst field crops. It is particularly useful late in the season for eradicating weeds and other volunteer plants protruding above the crop canopy and posing a problem during harvest. The roller applicator is designed to selectively dispense herbicide solution to the target plants by direct contact with an absorbent roller. The most common type utilizes carpet as the absorbent covering and is thus commonly referred to as a "carpet roller." A major problem with carpet rollers has been maintenance of the proper level of surface moisture for weed control. Drippage of the saturated carpet is minimized by continuous turning of the roller. When the roller is stopped, excessive drippage onto crops occurs due to the extensive fluid retained in the carpet material. This results in both crop damage and waste of herbicide. Emulsions and suspensions of wettable powders are not practical to use with carpet rollers because of phase separation induced by the filtering effect of the fiber pile. Likewise, the fibers can induce a salting-out of some formulations. Both types of separation result in a reduction in the effectiveness of the herbicide and a buildup of residue in the carpet, thereby limiting carpet rollers for use with only soluble materials. The present invention relates to a roller applicator which resolves these difficulties.

2. Description of the Prior Art

The problem of moisture control on carpet rollers has been addressed by Bertness (U.S. Pat. No. 4,253,272), Burnside (U.S. Pat. No. 4,223,479), and Schepers et al. (U.S. Pat. No. 4,265,048). In each of these patents, the moisture content of the roller is monitored as a function of an electrical value, and a system responsive to that value controls subsequent wetting of the carpet. Despite limited effectiveness of such systems, carpet rollers nonetheless remain susceptible to the aforementioned separation and cleaning problems. Keeton (U.S. Pat. Nos. 4,346,531 and 4,347,684) discloses an applicator in which the roller comprises a bare, hard plastic tube. A similar arrangement is taught by Lohoar in U.K. Pat. No. 2,083,732. However, in each case, absorbent materials are used to transfer liquid from the storage reservoir to the roller, thereby preempting any advantage relating to cleaning and avoidance of phase separation.

SUMMARY OF THE INVENTION

I have now devised a roller applicator which is universally applicable to all types of agronomic liquids and which avoids virtually all loss of material to nontarget areas. The applicator is designed to minimize the amount of nonrecoverable liquid as holdup, thereby facilitating cleaning and changing from one material to another.

The essential features of the invention include a nonabsorbent textured roller, a means for delivering liquid to the roller under low pressure, and a wiper system for spreading the liquid into a thin film on the roller surface and for channeling the excess into collectors for subsequent recirculation. The agitation imparted by the wiping and recirculating mechanisms is sufficient to maintain the integrity of multiphase formulations including emulsions, dispersions, and suspensions. Drippage is controlled under all conditions of use by virtue of surface tension between the thin liquid film and the textured roller surface.

In brief, it is an object of the invention to design an economical fluid applicator for plants with low capital cost and minimal use of fluid required for effective treatment.

It is also an object of the invention to design a roller applicator which is functional with virtually all types of liquid-based agricultural chemicals, especially herbicides.

Another object of the invention is to provide a roller applicator which is easy to drain and clean and which does not present a pollution hazard in the cleaning vicinity.

A further object of the invention is to provide a roller applicator which can be used on sloping terrain without drippage or spillage and which does not produce spray drift under windy conditions.

Other objects and advantages of the invention will become apparent from the ensuing description.

DETAILED DESCRIPTION OF THE INVENTION

Figure 1:
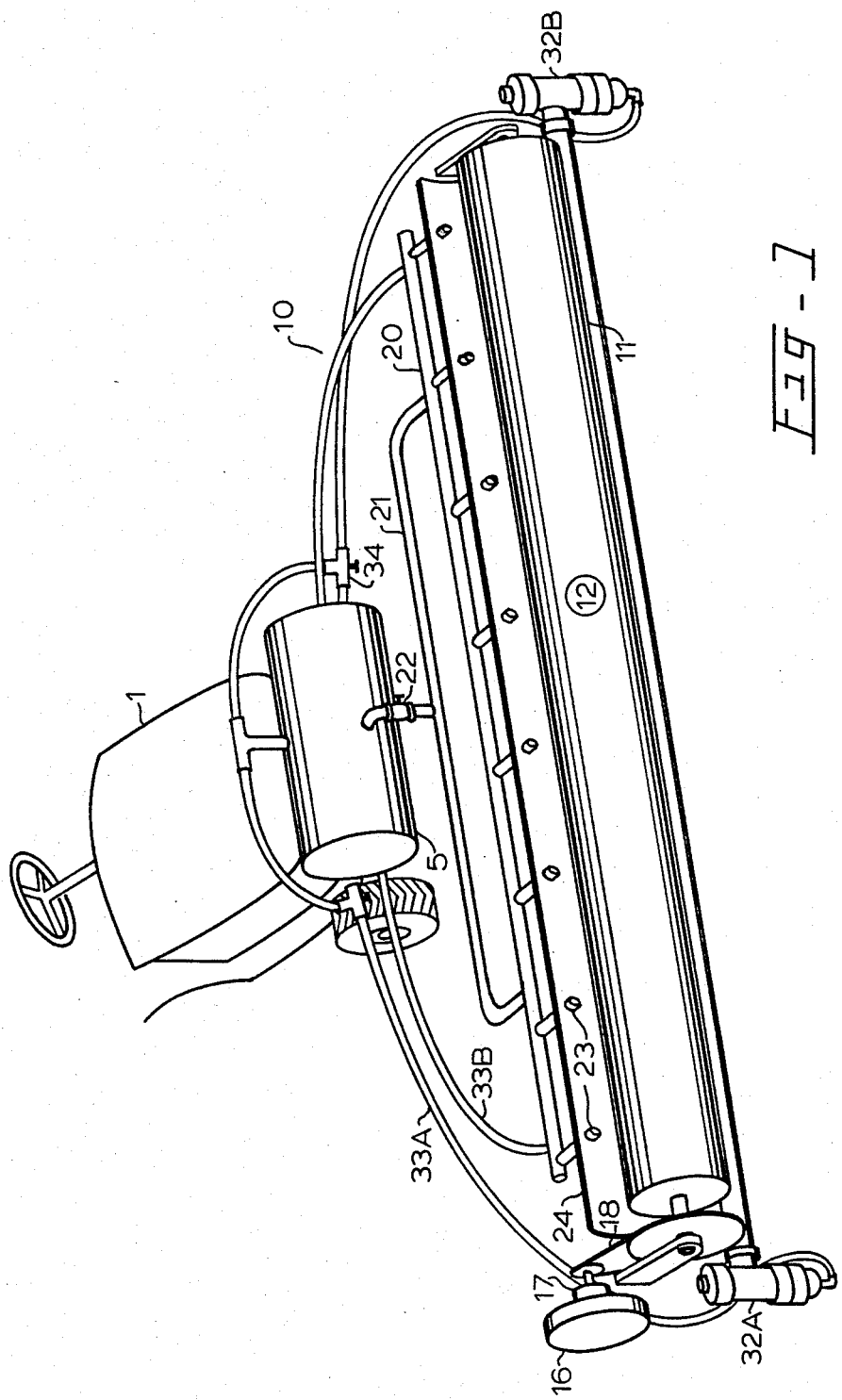
FIG. 1 is a perspective view of the nonabsorbent roller applicator of the invention.

Referring to FIG. 1, the roller applicator of the invention generally designated by the numeral 10 is most advantageously mounted by any suitable means on the front of a tractor 1 so as to be adjustable in the vertical direction. For example, it can be secured to the tool bar or attached to the cylinder arms of a front loader. Front mounting avoids dislocating target plants away from the roller by the passing vehicle. It also facilitates the visual facets of operation such as accommodating the height of the device to changing conditions. A reservoir 5 for storing the chemical is also mounted on the tractor or optionally can be secured directly to the framework of the applicator itself.

Figure 4:
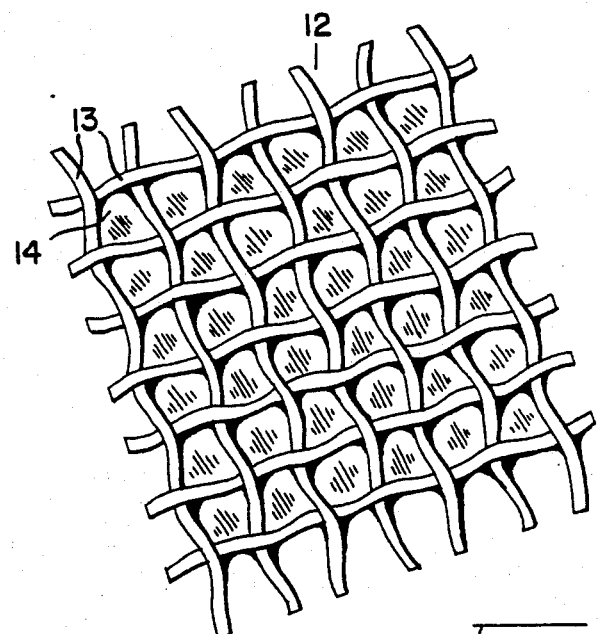
FIG. 4 is a detail view of the roller surface illustrating one embodiment of the texture.

The applicator comprises as its principal component a roller 11 having a nonabsorbent, textured surface 12. The roller is preferably constructed from a noncorrosive material such as rigid polyvinyl chloride (PVC) tubing. Of course other materials as known in the art would be equivalent to PVC for this purpose provided that they are impermeable to liquids. The texture should be sufficiently pronounced so that the surface tension between the liquid and the roller surface will counteract the cohesive forces of the liquid and inhibit its tendency to "bead" on the roller surface. When the liquid is properly spread onto the roller, it will thereby form a thin, uniform film which will be effectively transferred to target plants. The term "uniform" is used herein to denote uniformity of the average film thickness across the length of the roller with the understanding that there may be some variation in actual thickness across the relief of the texture. The texture can be formed by any conventional technique such as molding, etching, machining, or covering with a nonabsorbent fabric. For example, FIG. 4 illustrates the effect of covering the tubing with fiberglass insect screen and sealing the screen with epoxy resin. The result is a pattern of alternating ridges 13 and depressions 14 which are 1–2 mm. deep and 2–3 mm. in diameter.

Figure 2:
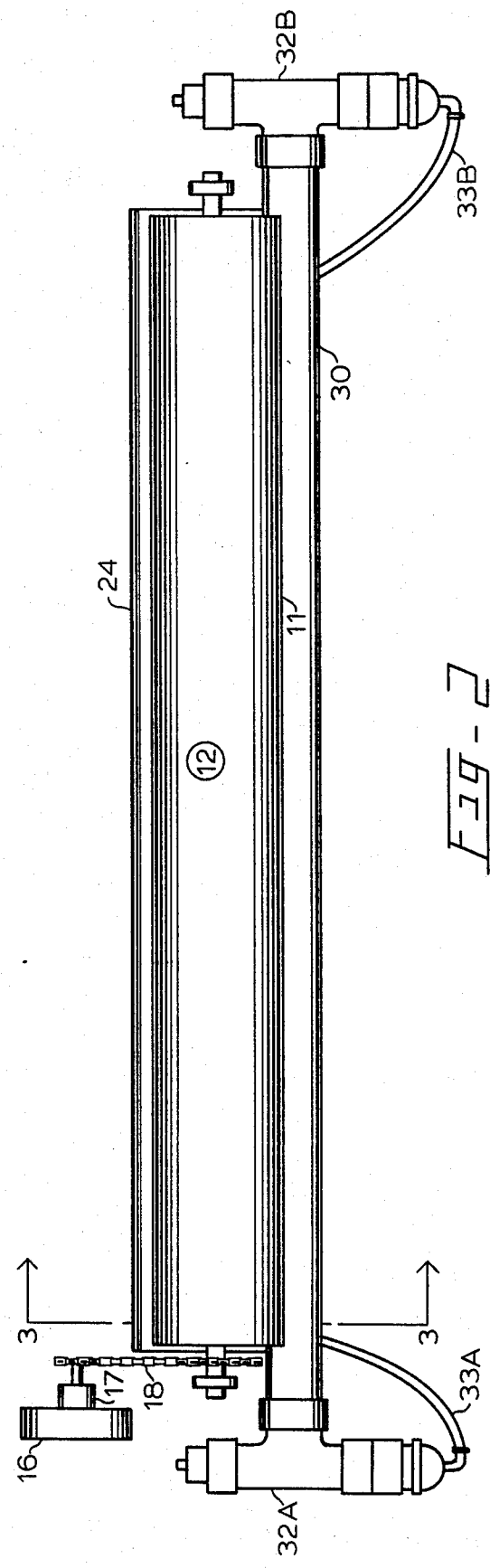
FIG. 2 is a front elevation view of the applicator shown in FIG. 1.
Figure 3:
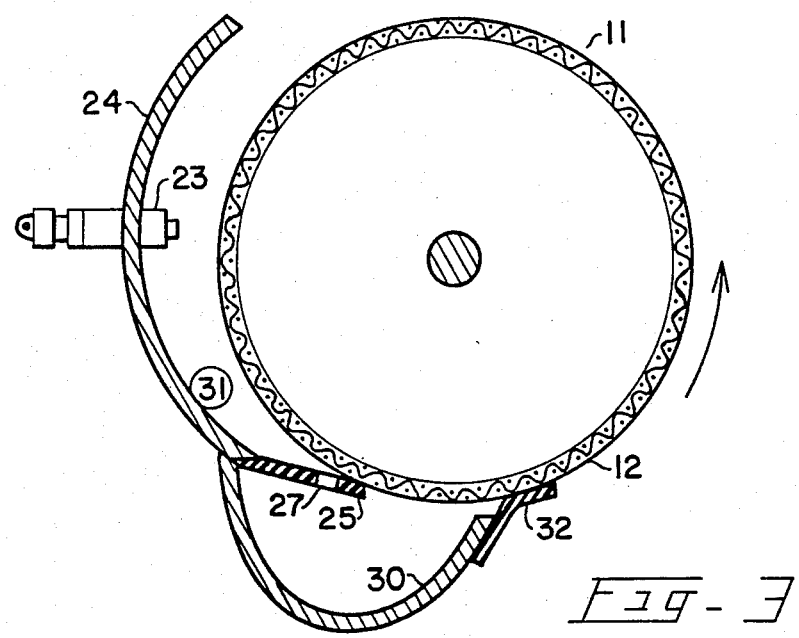
FIG. 3 is an enlarged sectional view taken along line 3—3 in FIG. 2.

Referring to both FIGS. 2 and 3, the roller 11 is mounted to be rotatably driven by motor 16 through a reduction gear 17 and chain drive 18. It is essential that the roller be rotated so that the leading (forward) edge of its surface moves in an upward direction. Thus, as the applicator advances through the field, the effect of frictional contact between the roller and the plant tends to support the plant in an upright position while the fluid is wiped on the stem and underside of the leaves. For reasons which will become apparent from the ensuing description, direction of rotation is also important to loading of fluid on the roller surface 12. The rotational speed is not necessarily critical but will typically be set within the range of 20–60 r.p.m. By use of a variable speed motor, the rate of rotation can be adjusted to instantaneous demand.

The herbicide or other fluid held in reservoir 5 is delivered by gravity or low pressure pump (not shown) to manifold 20 through supply line 21 optionally fitted with shutoff valve 22. The manifold distributes the fluid to a plurality of nozzles 23 mounted on shield 24. Sealingly attached to the lower end of shield 24 is a flexible wiper blade 25 preferably constructed of rubber or other pliable material and biased against roller surface 12. The fluid emitted from nozzles 23 flows into the space 31 defined by the roller on the one side and the shield 24 and wiper blade 25 on the other. Due to the low pressure of nozzles 23 and the protection provided by the roller and shield, loss of liquid by backsplatter and spray drift is virtually nil. The wiper blade 25 functions as a weir causing the fluid to spread out along the full length of the roller. Holes 27, one on either end of the blade, permit excess fluid to drain into trough 30, thereby preventing spillage from the ends of the device. On the forward edge of trough 30 is mounted a second wiper blade 32 which is also preferably constructed from a pliable material such as rubber. Blade 32 is biased against the roller surface as shown so as to squeegee the fluid into a thin film with the surplus flowing down into trough 30. Wipers 25 and 32 also conjointly serve to prevent spillage from the trough and to protect it from entry of plant debris and dirt.

Fluid collected in the trough is recirculated either to manifold 20 or reservoir 5 by means of low-pressure pumps 32A and 32B positioned on either end. While any conventional pump arrangement would be operable, continuously run electric pumps powered by the electric system of the tractor are preferred for the sake of simplicity and reliability. Screens (not shown) positioned at the intake of each pump will collect any debris which happens to enter the system. When recirculating the fluid to the manifold, it is advantageous for line 33A from the right pump 32A to be connected to the manifold near its leftmost end, and for the line 33B from the left pump 32B to be connected to the manifold near its rightmost end. In this manner, when the apparatus is on an incline, there will be at least partial compensation for the gravitational effect on the nozzle output along the length of the manifold. By inserting a T-valve 34 in each of the lines 33A and 33B, virtually all unused fluid at the completion of a field treatment can be pumped back to reservoir 5.

As previously mentioned, the present invention can be used to treat plants with a variety of chemical formulations inclusive of solutions, suspensions of wettable powders, emulsifiable concentrates, and the like. Due to the nonabsorbency of the component parts, the liquid holdup in the system at any given time is minimal. Consequently, the apparatus is especially suited for use with low volumes of highly concentrated formulations. In agriculture, the principal application is for use with herbicides in rescue weed control prior to harvest. Along roadways and other public right-of-ways, the instant device offers potential as an environmentally safe alternative to broadcase spraying. In general, it will have utility wherever rope wick applicators and carpet rollers have been used.

It is understood that the foregoing detailed description is given merely by way of illustration and that modification and variations may be made therein without departing from the spirit and scope of the invention.

What is claimed is:

1. A contact roller-type apparatus for applying a fluid to plants and adapted for mounting on a vehicle, said apparatus comprising:

a. a reservoir for storing said fluid;

b. a roller adapted for rotation about a generally horizontal axis and having a nonabsorbent textured surface for applying the fluid to the plants as the leading edge of the roller surface contacts the plant when the vehicle is moved in a forward direction, wherein the surface texture is sufficiently pronounced to inhibit the tendency of the liquid to bead on the roller surface;

c. means for rotating said roller such that the leading edge of the surface moves in an upward direction;

d. delivery means comprising a plurality of low-pressure nozzles spaced along a line parallel to the trailing edge of the roller and communicating with the reservoir by means of a manifold, wherein the nozzles are adapted to deliver the fluid directly to the roller surface;

e. wiper means for spreading said fluid delivered to the roller surface into a substantially uniform film across the length of the roller and for removing excess fluid from the surface, said wiper means comprising first and second wiper blades parallel to the axis of said roller and biased against the roller surface along virtually the entire length of the roller and adapted to channel the excess fluid into a collecting means wherein said second wiper blade is positioned near the forward edge of said collecting means; and f. means for collecting the excess fluid and recycling it to the reservoir or the delivery means, wherein said collecting means comprises a trough generally positioned below the roller, extending at least the length of the roller parallel to its axis, and spaced apart from the roller surface.

2. An apparatus as described in claim 1 further adapted for mounting on the front of said vehicle.

* * * * *